(12) United States Patent
Boonsawat

(10) Patent No.: US 10,538,708 B2
(45) Date of Patent: Jan. 21, 2020

(54) RECYCLING AND RECOVERING METHOD AND SYSTEM OF PLASTIC WASTE PRODUCT

(71) Applicant: Songpol Boonsawat, Walnut, CA (US)

(72) Inventor: Songpol Boonsawat, Walnut, CA (US)

( * ) Notice: Subject to any disclaimer, the term of this patent is extended or adjusted under 35 U.S.C. 154(b) by 0 days.

(21) Appl. No.: 15/356,638

(22) Filed: Nov. 20, 2016

(65) Prior Publication Data

US 2018/0142164 A1    May 24, 2018

(51) Int. Cl.
| | | |
|---|---|---|
| *C10B 53/07* | (2006.01) | |
| *C08J 11/10* | (2006.01) | |
| *C10G 1/10* | (2006.01) | |
| *C10L 1/04* | (2006.01) | |
| *B01D 53/00* | (2006.01) | |
| *B01D 5/00* | (2006.01) | |
| *B01J 6/00* | (2006.01) | |
| *C10B 57/18* | (2006.01) | |

(52) U.S. Cl.
CPC .............. *C10G 1/10* (2013.01); *B01D 5/0072* (2013.01); *B01D 53/002* (2013.01); *B01J 6/008* (2013.01); *C08J 11/10* (2013.01); *C10B 53/07* (2013.01); *C10B 57/18* (2013.01); *C10L 1/04* (2013.01); *C10G 2300/1003* (2013.01); *C10G 2400/26* (2013.01); *C10L 2290/02* (2013.01); *C10L 2290/06* (2013.01); *C10L 2290/547* (2013.01)

(58) Field of Classification Search
None
See application file for complete search history.

(56) References Cited

U.S. PATENT DOCUMENTS

| | | | | |
|---|---|---|---|---|
| 3,880,617 A | * | 4/1975 | Shibuya ................. | C10K 1/121 95/166 |
| 3,890,206 A | * | 6/1975 | Wunsch .................. | C10B 27/00 202/254 |
| 4,299,356 A | * | 11/1981 | Struck ...................... | F04F 5/04 202/256 |
| 4,412,889 A | * | 11/1983 | Oeck ....................... | C10B 47/44 202/117 |
| 5,085,738 A | * | 2/1992 | Harris ...................... | C10B 7/06 201/11 |
| 5,411,714 A | * | 5/1995 | Wu ......................... | C09C 1/482 110/108 |

(Continued)

FOREIGN PATENT DOCUMENTS

| | | | | | |
|---|---|---|---|---|---|
| GB | | 190929125 A | * 12/1910 | ............. | C10B 27/06 |
| WO | WO-2016097742 A1 | * 6/2016 | ............. | F23L 15/02 |

*Primary Examiner* — Jennifer A Leung
(74) *Attorney, Agent, or Firm* — Raymond Y. Chan; David and Raymond Patent Firm

(57) ABSTRACT

A recycling method for plastic waste includes the steps of: (a) placing the plastic waste into a reactor; (b) heating the plastic waste in the reactor through a pyrolysis recovery process to generate flammable gas; (c) transferring flammable gas through a condensing unit to convert the flammable gas into liquid phase products; and (d) filtering the remaining out clean gas from the flammable gas by a filtration unit. A recycling system for plastic waste includes a reactor to decompose the plastic waste to create usable fuel products; a condensing unit operatively connected with the reactor; and a filtration unit operatively connected with said condensing unit to filter the usable fuel products.

9 Claims, 2 Drawing Sheets

(56) References Cited

U.S. PATENT DOCUMENTS

| | | | | |
|---|---|---|---|---|
| 5,821,396 A | * | 10/1998 | Bouziane | C10B 47/30 585/241 |
| 6,255,547 B1 | * | 7/2001 | Smuda | C10G 1/08 201/2.5 |
| 8,795,475 B2 | * | 8/2014 | Hutchins | C10B 1/10 201/25 |
| 2003/0228196 A1 | * | 12/2003 | Satchwell | B09B 3/00 405/128.5 |
| 2012/0066974 A1 | * | 3/2012 | Jorgenson | C10L 31/10 48/61 |
| 2014/0121426 A1 | * | 5/2014 | Tandon | C10G 31/10 585/241 |

* cited by examiner

RECYCLING AND RECOVERING METHOD AND SYSTEM OF PLASTIC WASTE PRODUCT

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to all types of plastic waste in forms of an organic compound disposal method and system, and more particularly to the organic compound disposal method and system which is able to close the loop of plastic waste products (organic compound material) and its lifecycle and generate more valuable usable fuel products such as flammable hydrocarbon gas and liquid fuels.

Description of Related Arts

Organic compounds, such as polyethylene (organic compounds) and plastic material, are widely used materials, and provide more convenient daily's life for most of people in today's world. However, the recycling and disposal treatment for the organic compounds, especially the plastic wastes, always has environment issues, since the plastic wastes are non-biodegradable material. The major disposal treatment for the plastic wastes is that the plastic wastes are sent and disposed in landfills where the plastic wastes cannot be decomposed for hundreds of years. In addition, the plastic wastes can be buried into the oceans it is influenced by global currents that distribute it around the world. However, the above mentioned organic compound disposal treatment has the following drawback. Since the above mentioned organic compounds disposal treatments don't close the loop of the organic compounds lifecycle, the landfill capacity cannot match with the growth speed of the plastic wastes, so the other organic compound disposal treatment which is able to close the lifecycle of the plastic wastes is highly necessary.

An improved disposal treatment for degrading the plastic wastes is provided, wherein the plastic wastes are degraded under the high temperature. In such a manner, the plastic wastes are degraded at a temperature above 400° C. under a catalyst, and the gas, oil, gum, wax, and a series of by-products are generated during the degradation. Since the by-products of the above mentioned degradation for the organic compounds waste are too complicated, the recycling treatment for the by-products also a very important issue. In addition, the high temperature of the degradation is a high consumption reaction, so it is also not an economy organic compound disposal treatment.

SUMMARY OF THE PRESENT INVENTION

The invention is advantageous in that it provides a recycling method and system for plastic waste which is able to not only close the loop of the lifecycle of the plastic waste, but also can generate more valuable usable fuel products.

Another advantage of the invention is to provide a recycling method and system for plastic waste, wherein the recycling method and system are able to deliver plastic waste from landfill to process the pyrolysis recovery reaction, and then the usable fuel products which can be used internally or to be sold to local community.

Another advantage of the invention is to provide a recycling method and system for plastic waste, wherein the recycling method and system has one way emission control and gas treatment with energy recycle to ensure the low emission, low energy required and high process efficiency.

Another advantage of the invention is to provide a recycling method and system, wherein the plastic product is degraded through cross-alkane metathesis between the plastic waste and the alkane, so as to efficiency breakdown of PE chain into shorter chains.

Another advantage of the invention is to provide a recovering method and system, wherein the plastic product is degraded through cross-alkane metathesis between the plastic waste and the alkane, so as to efficiency breakdown of Polymers (PET, HDPE,LDPE,PP,PVC,PS, ABS, PC) and other types of plastic materials chain into shorter chains.

Another advantage of the invention is to provide a recycling method and system, wherein the harmful bacteria, flies, and odor problems are efficiently eliminated in the landfill since less amount of plastic waste are deposed into the landfill, so as to prolong the lifespan of the landfill.

Another advantage of the invention is to provide a recycling and recovering method and system, wherein the harmful bacteria, flies, and odor problems are efficiently eliminated in the landfill since less amount of plastic waste are deposed into the landfill and contaminated the landfill, so as to prolong the lifespan of the landfill.

Additional advantages and features of the invention will become apparent from the description which follows, and may be realized by means of the instrumentalities and combinations particular point out in the appended claims.

According to the present invention, the foregoing and other objects and advantages are attained by a recycling method for plastic waste, wherein the recycling method comprises the steps of:

(a) placing the plastic waste e.g. Polymers (PET, HDPE, LDPE,PP,PVC,PS, ABS, PC) and other types of plastic materials into a reactor;

(b) heating the plastic waste in the reactor through a pyrolysis recovery process to generate flammable gas;

(c) transferring flammable gas through a condensing unit to convert the flammable gas into liquid phase products; and separate non condensable gas to transfer through filtration system and; and (d) filtering out clean gas from the remaining flammable gas by a filtration unit.

In accordance with another aspect of the invention, the present invention comprises a recycling and recovering system for plastic waste which comprises:

a reactor to decompose the plastic waste to generate usable fuel products when the plastic waste is heated in the reactor;

a condensing unit operatively connected with the reactor with unique condensing parameter setting according to the targeted input material; and a filtration unit operatively connected with the condensing unit to to separate the unwanted gas content of non condensable gas products which has just separated from the condensing unit.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 1:
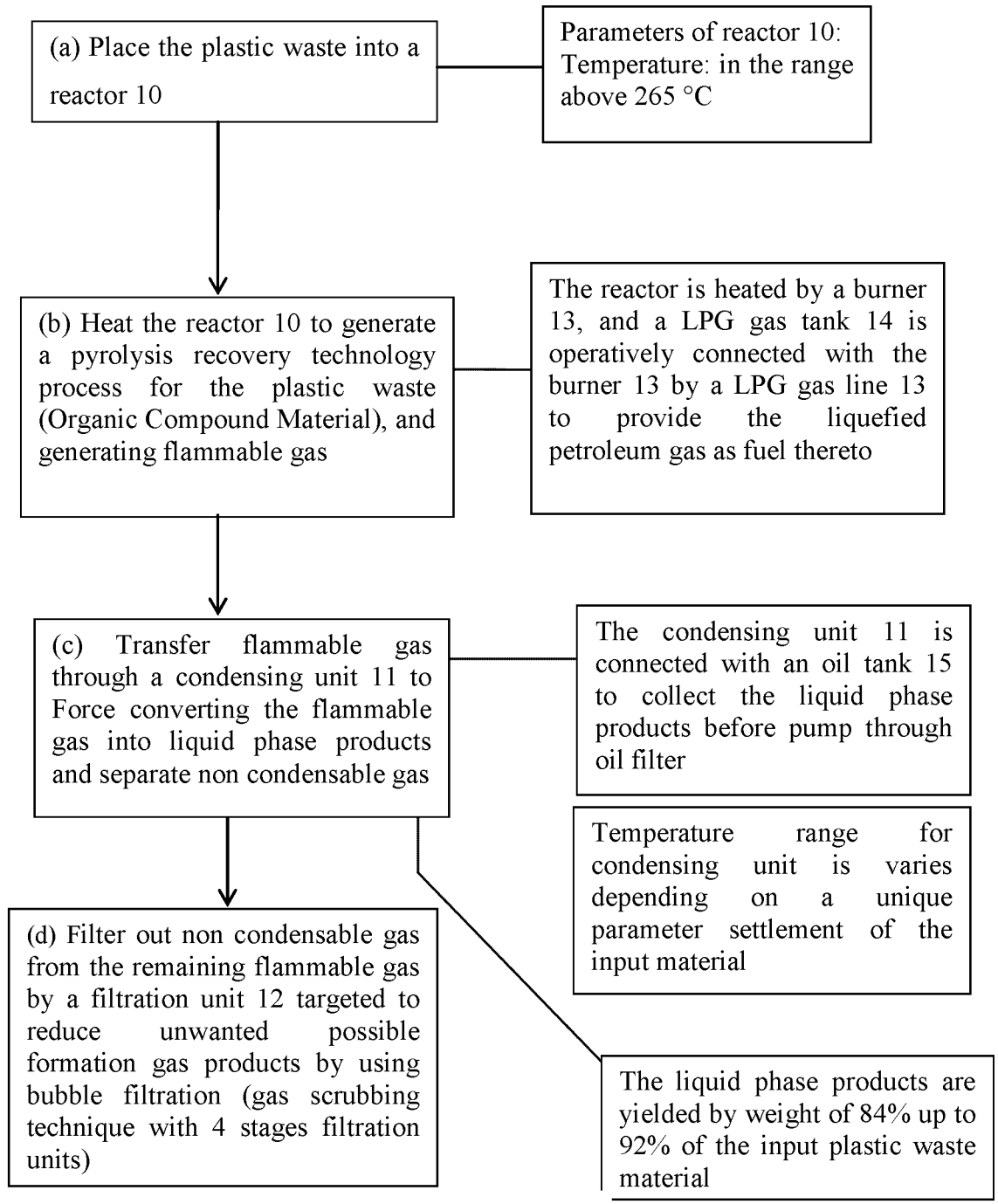
FIG. 1 is a block diagram of a recycling method for plastic waste according to a first preferred embodiment of the present invention.

Referring to FIG. 1 of the drawings, a recycling method for all types of plastic waste according to a first preferred embodiment of the present invention, wherein the method is able to efficiently close the loop of the plastic waste lifecycle, especially for the plastic waste, and generates more valuable and environmentally sustainable usable fuel products. The method comprises the following steps.

(a) Place the plastic waste into a reactor 10.

(b) Heat the plastic waste in the reactor 10 through a pyrolysis recovery process without participation of air (Lack of mainly Oxygen and Nitrogen) to generate flammable gas.

(c) Transfer the flammable gas through a condensing unit 11 to force converting the flammable gas in gas form into liquid phase products (with a unique condensing parameter for the targeted material) and separate the non condensable gas to be transferred to filtration unit for gas cleaning process.

(d) Filter out clean gas from the remaining non condensable flammable gas by a filtration unit 12.

In the step (a), the reactor 10 is connected to a liquid spray system 101 adapted to neutralize acid gas emitted from the reaction inside the reactor 10, and the liquid spray system 101 is connected to an exhaust pipe 102, after the acid gas is neutralized through the liquid spray system 101, the neutralized acid gas can be emitted from the reactor 10 to reduce the pressure inside the reactor 10.

In the step (b), the reactor is heated by a burner 13 with operating temperature above 265° C., wherein a LPG gas tank 14 is operatively connected with the burner 13 by a LPG gas line 13 to provide the liquefied petroleum gas as fuel thereto.

In the step (c), the condensing unit 11 is connected with an oil tank 15 to collect the liquid phase products, so after the flammable gas is condensed by the condensing unit 11 to form liquid phase products and also separate the non condensable gas, the liquid phase products are collected into the oil tank 15 before pump to oil filter. It is worth mentioning that the liquid phase products are collected from the outlet after filtered, and are prepared to be used in a machinery and engine, or applied or blended with the normal fuel, such as fuel oil, diesel, petrol and etc. to be use with petrol and diesel generator, engine or further designate system, such as gas or jet turbines.

In the step (c), the liquid phase products are by weight of 84% to 92% of the plastic waste.

In the step (d), the filtration system 12 is connected with the condensing unit 11 and the burner 13, wherein the filtration system 12 is connected with the burner 13 by a return flammable gas line 121, so while the remaining non condensable flammable gas is delivered to and filtered into the filtration system 12, the clean gas is delivered back to the burner 13 by the return flammable gas line 121 to be used to generate heat energy to the reactor 10 and then emit to the outside of the system with lower emission due to clean gas combustion with High temperature. It is worth mentioning that the clean gas is non-toxic gas acceptable to be released to the environment.

Accordingly, there are four usable fuel products generated from the method: fuel oil, carbon char, flammable gases, and electricity power, wherein the carbon char is qualitied as activated carbon which is a final stage solid recourse in the reactor 10.

Accordingly, in the step (b), the plastic waste is heated into the reactor through a pyrolysis recovery technology. In the reactor, the plastic waste is degraded based on a tandem catalytic cross alkane metathesis (CAM) process. For example, the plastic product is polyethylene (PE) polymer. The PE degradation involves one catalyst for alkane hydrogenation and another catalyst for olefin metathesis, wherein the PE degradation comprises the following steps:

(1) adding dehydrogenation catalyst to remove hydrogen from both PE and a light alkane to create unsaturated olefins; and (2) adding olefin metathesis catalyst to scramble the unsaturated olefins, and the following by hydrogenation to breakdown PE chains.

In the step (1), the dehydrogenation catalyst can be a supported "princer"-ligated iridium complex, such as $(^{t\text{-}Bu}PCP)IrH_2$ and Brookhart's bis(phosphinite)-ligated $(^{t\text{-}Bu}POCOP)Ir$ complex, such as $(t\text{-}Bu_2PO-^{t\text{-}Bu}POCOP)Ir(C_2H_4)$ or $(MeO-^{i\text{-}Pr}POCOP)Ir(C_2H_4)$ and the dehydrogenation catalyst is adapted to remove hydrogen from both the PE and the light alkane in a sealed system.

In the step (1), the light alkane can be n-hexane.

In the step (2), the olefin metathesis catalyst can be $Re_2O_7/\gamma\text{-}Al_2O_3$.

In the step (2), the PE is degraded into liquid fuels and waxes, and the excess light alkanes is repetitively processed CAM results in degradation of PE into short alkane appropriate for us as transportation oil.

In the step (c), the reactor 10 is further connected to a control unit 18 to adjust parameter inside the reactor 10, wherein the control unit 18 comprises a digital control module 181, a monitoring module 182, and a multi data logger 183, wherein the digital control module 181 is adapted to adjust temperature, pressure, and reaction time of the reactor 10, and the amount of catalytic converting into the reactor 10, wherein the monitoring module 182 is a screen to display the parameters for the pyrolysis recovery reaction, wherein the multi data logger 183 is adapted to save results of the pyrolysis recovery reaction.

It is worth mentioning that the reactor 10 is further connected to a heat exchanger 16 to recycle the thermal usage from the reactor 10 and a water tank 1 to provide cool water to the reactor 10, and the water tank 17 comprises a water pump 171 to control the amount of water delivered into the reactor 10. Accordingly, the reaction inside the reactor 10 can generate certain amount of heat energy, and the heat energy can be recycled for other purpose's use through the heat exchanger 16. For example, the heat energy can be transferred into electric energy to provide electric power to our daily life.

Figure 2:
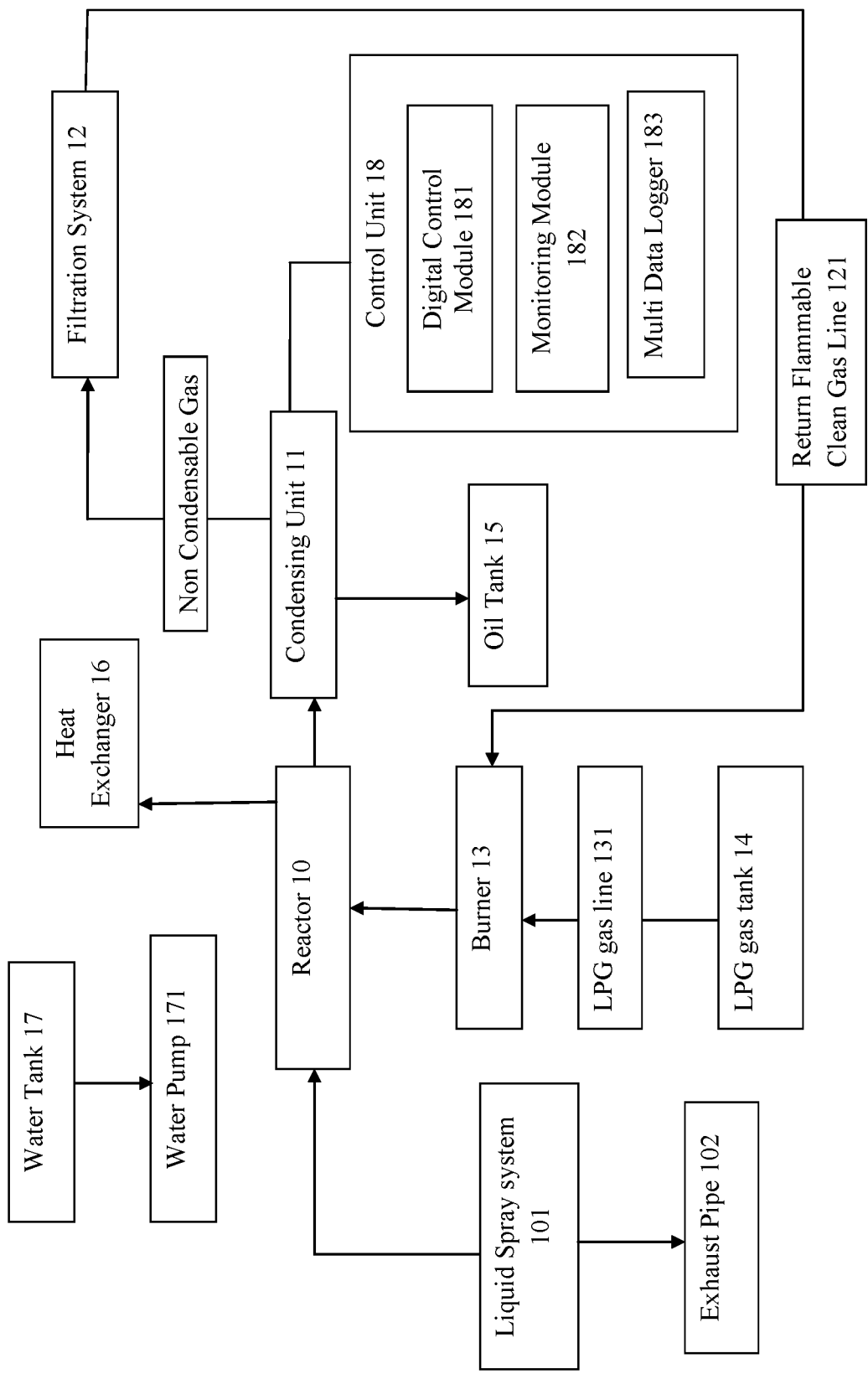
FIG. 2 is a block diagram of a recycling system for plastic waste according to a second preferred embodiment of the present invention.

Referring to FIG. 2 of the drawings, a recycling system for plastic waste according to a second preferred embodiment of the present invention is illustrated, wherein the recycling system comprises a reactor 10 adapted to decompose the plastic waste, a condensing unit 11 operatively connected with the reactor 10, a filtration system 12 operatively connect with the condensing unit 11.

The plastic wastes are disposed in the reactor to process the pyrolysis recovery reaction. After the plastic waste are processed by the pyrolysis recovery reaction, the pyro gas is generated and transferred to the condensing unit 11, and is condensed by the condensing unit 11 to form energy liquid (liquid phase product). And, the system further comprises an oil tank 15 connected to condensing unit 11 to collect the liquid phase products, so after the flammable gas is condensed by the condensing unit 11 to form liquid phase products, the liquid phase products are collected into the oil tank 15. It is worth mentioning that the liquid phase products are collected from the outlet, and are prepared to be used in a machinery and engine, or applied or blended with the normal fuel, such as fuel oil, diesel, petrol and etc. to be use with petrol and diesel generator, engine or further designate system, such as gas or jet turbines.

It is worth mentioning that the system further comprises a burner 13, a LPG gas tank 14, and a LPG gas line 13 connected between the burner 13 and the LPG gas tank 14 to provide the liquefied petroleum gas as fuel from the LPG gas tank 14 to the burner 13. And, the system further comprises a control unit 18 operatively connected with the reactor 10, wherein the control unit 18 comprises a digital control module 181, a monitoring module 182, and a multi data logger 183, wherein the digital control module 181 is adapted to adjust temperature, pressure, and reaction time of the reactor 10, and the amount of catalytic converting into the reactor 10, wherein the monitoring module 182 is a screen to display the parameters for the pyrolysis recovery reaction, wherein the multi data logger 183 is adapted to save results of the pyrolysis recovery reaction.

Accordingly, the system further comprises a liquid spray system 101 connected to the reactor 10 adapted to neutralize acid gas emitted from the reaction inside the reactor 10, and the liquid spray system 101 connected to an exhaust pipe 102, so after the acid gas is neutralized through the liquid spray system 101, the neutralized acid gas can be emitted from the reactor 10 to reduce the pressure inside the reactor 10.

Accordingly, the filtration system 12 is operatively connected to the condensing unit 11 and the burner 13, wherein the filtration system 12 is adapted to filter the remaining flammable gas to form clean gas, so after the remaining flammable gas generated from the reaction inside the reactor is filtered inside the filtration system 12, the clean gas can be emitted to outside, and the remaining flammable gas is delivered back to the burner 13 through the return flammable gas line 121.

It is worth mentioning that the reaction inside the reactor 10 is the same as mentioned in the first preferred embodiment of the present invention, which is that the plastic waste is heated into the reactor through a pyrolysis recovery technology. In the reactor, the plastic waste is degraded based on a tandem catalytic cross alkane metathesis (CAM) process.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A recycling and recovering system for plastic waste, comprising:
a burner;
a reactor, wherein the plastic waste is heated in said reactor by said burner to generate usable fuel products in gas form;
a condensing unit operatively connected with said reactor, wherein said condensing unit converts said usable fuel products into liquid phase products;
a filtration system operatively connected with said condensing unit to filter said usable fuel products;
a liquid spray system connected to said reactor to neutralize acid gas emitted from a reaction inside said reactor;
an exhaust pipe connected to said liquid spray system for discharging the neutralized acid gas from said reactor to reduce pressure inside said reactor after the acid gas is neutralized, and
a return flammable gas line, wherein said filtration system is connected with said burner by said return flammable gas line, so while remaining flammable gas from the usable fuel products is delivered to and filtered into said filtration system, the remaining flammable gas is delivered back to said burner by said return flammable gas line.

2. The recycling and recovering system, as recited in claim 1, wherein the plastic waste are disposed in said reactor to process a pyrolysis recovery reaction.

3. The recycling and recovering system, as recited in claim 2, wherein the plastic waste is heated in said reactor by said burner with an operating temperature above 400° C., wherein a plastic degrading catalyst is added into said reactor for degrading the plastic waste.

4. The recycling and recovering system, as recited in claim 3, further comprising a LPG gas tank operatively connected with said burner through a LPG gas line to provide the liquefied petroleum gas as fuel in said burner.

5. The recycling and recovering system, as recited in claim 2, further comprising an oil tank connected with said condensing unit to collect the liquid phase products.

6. The recycling and recovering system, as recited in claim 2, further comprising a control unit operatively connected with said reactor to control parameters of said reactor and to control parameter of said condensing unit.

7. The recycling and recovering system, as recited in claim 6, wherein said control unit comprises a digital control module to adjust parameters of said reactor, a monitoring module to display the parameters for the pyrolysis recovery reaction, and a multi data logger to save results for the pyrolysis recovery reaction.

8. The recycling and recovering system, as recited in claim 2, further comprising a heat exchanger connected to said reactor to recycle a thermal usage from said reactor and a water tank connected to said reactor to provide cool water to thereto.

9. The recycling and recovering system, as recited in claim 8, wherein said water tank comprises a water pump to control the amount of water delivered into said reactor.

* * * * *